US008578986B2

United States Patent
Majumdar

(10) Patent No.: US 8,578,986 B2
(45) Date of Patent: Nov. 12, 2013

(54) PNEUMATIC TIRE HAVING A BUILT-IN SEAMLESS POLYURETHANE SEALANT LAYER AND PREPARATION THEREOF

(75) Inventor: Ramendra Nath Majumdar, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 861 days.

(21) Appl. No.: 12/641,536

(22) Filed: Dec. 18, 2009

(65) Prior Publication Data

US 2011/0146869 A1    Jun. 23, 2011

(51) Int. Cl.
B60C 19/12    (2006.01)
B60C 5/14    (2006.01)

(52) U.S. Cl.
USPC ............ 152/503; 152/504; 152/510; 156/115

(58) Field of Classification Search
USPC ..................... 152/502–507, 510; 156/115
See application file for complete search history.

(56) References Cited

U.S. PATENT DOCUMENTS

| 3,615,987 | A | * | 10/1971 | Blatz et al. | ...................... | 156/133 |
| 4,359,354 | A | * | 11/1982 | Bohm | ............................. | 156/115 |
| 4,774,142 | A | * | 9/1988 | Schmidt et al. | ............. | 428/423.3 |
| 2006/0169393 | A1 | * | 8/2006 | Botts et al. | ...................... | 156/115 |
| 2009/0078352 | A1 | | 3/2009 | Majumdar et al. | ............. | 152/504 |

FOREIGN PATENT DOCUMENTS

| DE | 4030474 | | 4/1991 | ............. B29D 30/08 |
| EP | 1985436 | * | 10/2008 | |
| EP | 2039500 | | 3/2009 | ................ B60C 1/00 |

OTHER PUBLICATIONS

English machine translation of EP1985436, dated Oct. 2008.*
Steven K. Henning and Herbert Chao, "Application of Diene-Based Thermoplastic Urethane in Rubber Compounding,", Presented at the Fall 168th Technical Meeting of the Rubber Division, American Chemical Society, Nov. 1-3, 2005.*
European Search Report completed Feb. 21, 2011.

* cited by examiner

*Primary Examiner* — Justin Fischer
*Assistant Examiner* — Robert Dye
(74) *Attorney, Agent, or Firm* — Henry C. Young, Jr.

(57) ABSTRACT

The present invention is directed to a pneumatic tire having a built-in seamless polyurethane sealant layer and its preparation.

4 Claims, 1 Drawing Sheet

PNEUMATIC TIRE HAVING A BUILT-IN SEAMLESS POLYURETHANE SEALANT LAYER AND PREPARATION THEREOF

FIELD OF THE INVENTION

The present invention is directed to a pneumatic tire having a built-in seamless polyurethane sealant layer and its preparation.

BACKGROUND OF THE INVENTION

Pneumatic tires have been suggested which contain built in polyurethane based sealant layers which can flow into a tire puncture hole for a purpose of resisting flow of tire inflation air through the tire puncture and to thereby promote a resistance of the pneumatic tire going flat by loss of tire inflation air. For example, see U.S. Patent Application Serial No. 2009/0078352.

Such polyurethane sealant layers may be formed, for example, by application of a pre-formed solid polyurethane based sealant precursor layer to an uncured rubber tire assembly and curing the tire assembly in a suitable mold at an elevated temperature in which the polyurethane sealant precursor is degraded to form a better built in polyurethane based sealant layer within the tire having tire sealing properties.

However, effectively splicing the ends of the solid polyurethane based sealant precursor together to form an annular solid sealant precursor layer for the tire construction presents a challenge, particularly since, for example, a splice created by overlapping ends of the polyurethane layer gives rise to an imbalance of the tire.

Accordingly, is it an important aspect of this invention to enhance the solid annular sealant precursor layer by eliminating the splicing of its ends altogether. This is accomplished by spin casting a liquid polyurethane based sealant precursor reaction mixture into a tubular form and allowing the liquid sealant precursor reaction mixture to react and create a solid pre-formed seamless tubular shaped polyurethane based sealant precursor. A section of the pre-formed seamless tubular solid sealant precursor is cut from the tube and applied as an annular solid polyurethane based sealant precursor layer in an uncured pneumatic rubber tire following which the tire assembly is cured at an elevated temperature during which the solid annular tire polyurethane based sealant precursor layer is degraded and thereby converted to a built-in polyurethane based tire sealant layer within the tire with better (e.g. more efficient) sealing ability (in its degraded polyurethane form) to seal against various tire puncturing objects.

SUMMARY OF THE INVENTION

The present invention is directed to a pneumatic tire having a built-in polyurethane sealant layer and the method of manufacturing such a tire.

In accordance with this invention a pneumatic tire is provided comprised of a sulfur cured assembly including an outer circumferential rubber tread, an underlying supporting carcass, rubber barrier layer (sulfur curable rubber) inwardly disposed on said carcass (thereby radially inward of and underlying said carcass), built-in seamless polyurethane sealant layer inwardly disposed on said rubber barrier layer (thereby radially inward of and underlying said rubber barrier layer) and an inner liner rubber layer inwardly disposed on said polyurethane based sealant layer (thereby radially inward of the sealant layer).

By virtue of the foregoing, there is provided a pneumatic tire that has an ability to seal against various tire puncturing objects.

In further accordance with this invention a method of preparing a pneumatic tire is comprised of:

(A) applying a circumferential, annular uncured tire innerliner rubber layer on a tire-building apparatus, (B) fitting over said innerliner rubber layer a pre-formed seamless annular solid polyurethane sealant precursor layer (without an end splice), (C) building a remainder of tire components thereover comprised of a tire carcass and an outer rubber tire tread onto the tire carcass to define an unvulcanized tire assembly and removing the unvulcanized tire assembly from said building drum, (D) sulfur vulcanizing the unvulcanized tire assembly in a suitable mold at an elevated temperature.

In practice, as the unvulcanized tire assembly is vulcanized (sulfur vulcanized) at an elevated temperature in a suitable mold the polyurethane based sealant precursor layer degrades to provide the pneumatic tire with a built-in sealant layer with better (e.g. more efficient than the polyurethane before it is degraded) sealing ability for various puncturing objects.

BRIEF DESCRIPTION OF THE DRAWINGS

For a better understanding of the invention, the accompanying drawings are provided.

In the drawings.

DETAILED DESCRIPTION OF THE DRAWINGS

Figure 1:
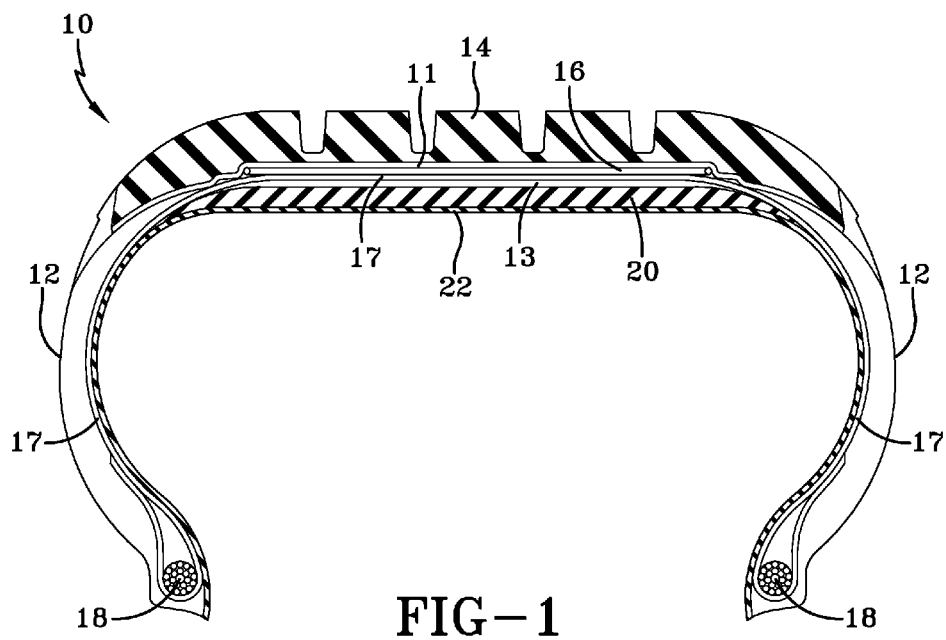
FIG. 1 is a cross-sectional view of a pneumatic tire which contains an annular polyurethane based built-in seamless sealant layer to illustrate one embodiment of the present invention.

In FIG. 1, a cross-section of a pneumatic tire 10 is presented comprised of a tread 14 which includes a tread base rubber layer 11, sidewalls 12, spaced apart beads 18 and carcass underlying the tread 14 (including the tread rubber base 11) comprised of cord reinforced rubber belt plies 16 (e.g. wire cord reinforced), cord reinforced rubber carcass ply 17 (e.g. synthetic cord, such as for example polyester or nylon cord reinforced) and barrier rubber layer 13, comprised of a sulfur curable rubber composition, together with a pre-formed annular seamless polyurethane based sealant layer 20 and rubber inner liner layer 22 where said polyurethane based sealant layer 20 has a property of sealing punctures of the tire caused by various puncturing objects.

The individual sidewalls 12 extend radially inward from the axial outer edges of the tread portion 14 to join the respective inextensible beads 18. The annular seamless sealant layer 20 is positioned between the barrier rubber layer 13 of the carcass, and the rubber inner liner layer 22.

Figure 2:
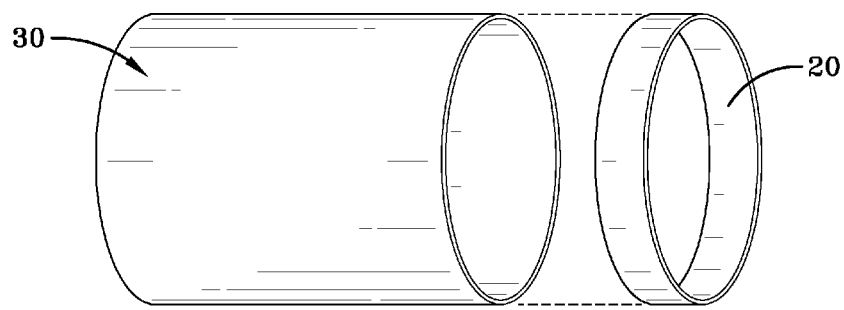
FIG. 2 is a perspective view of a pre-formed seamless, tubular shaped solid polyurethane sealant precursor to illustrate a further embodiment of the invention.

In FIG. 2, a tubular cylinder 30 of the seamless solid polyurethane sealant precursor is shown. A portion of the tubular cylinder 30 is cut to provide a seamless annular hoop 20 of a seamless polyurethane based sealant precursor which is built into the tire 10 as the seamless polyurethane based sealant 20 of FIG. 1. The seamless polyurethane cylinder 30 is formed by spin casting (e.g. rotational casting by conventional means for a liquid polyurethane reaction mixture) a liquid polyurethane reaction mixture in a suitable mold and allowing the reaction mixture to react and form a solid polyurethane in the shape of the tubular cylinder 30.

As indicated above, a tubular cylinder section 20 is cut away from the tubular cylinder 30 and applied to an uncured tire inner liner rubber layer 22 on a tire building drum as a pre-formed annular seamless polyurethane based tire sealant precursor layer 20 for the tire 10. The tire assembly is cured at an elevated temperature during which the solid annular tire sealant precursor layer is degraded and converted to a better built in tire sealant layer 20 (better in a sense of being a better sealant than said polyurethane precursor layer) within the tire having sealing properties for various puncturing objects.

Figure 3:
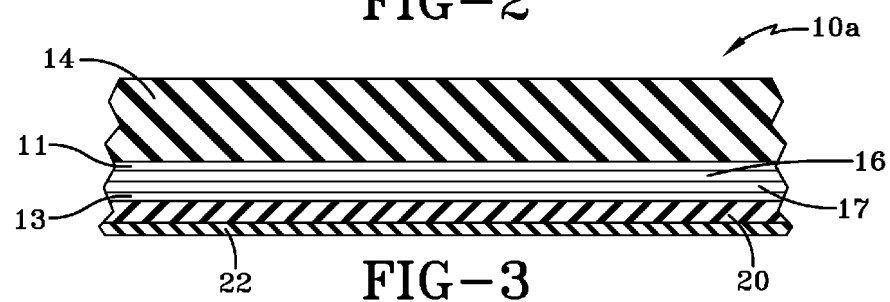
FIG. 3 is a depiction of the cross section of the tire of FIG. 1 with the sealant layer.

In FIG. 3, a layered composite is shown to relate to a partial cross-section of the sulfur cured pneumatic tire 10a with a polyurethane sealant layer.

The polyurethane is desirably a self-healing polyurethane elastomeric material, which may be a reaction product of, for example, methylene diphenyl 4,4'-diisocyanate (MDI) and poly(alkylene oxide) glycol. A suitable polyurethane composition for use as the precursor sealant layer may be obtained from Novex, Inc. of Wadsworth, Ohio. It should be understood that formulations of polyurethane materials that can be used for the self-healing polyurethane composition may be readily produced by persons having ordinary skill in the art from known chemistry techniques in the production of polyurethanes.

After vulcanization of the tire assembly at an elevated temperature, the polyurethane sealant precursor is in a form of a tacky polyurethane composition which provides the pneumatic tire 10 with self-sealing properties against various puncturing objects and defines the built-in sealant layer 20.

The polyurethane sealant precursor used for the sealant layer 20 generally has sufficient viscosity and enough unvulcanized tack to enable its incorporation into an unvulcanized tire without substantially departing from standard tire building methods.

The rubber tire inner liner 22 may be any known rubber inner liner for use in pneumatic tires, particularly a sulfur curable rubber composition. In one example, the rubber inner liner 22 can be a sulfur curative-containing halobutyl rubber composition of a halobutyl rubber such as for example chlorobutyl rubber or bromobutyl rubber. Such halobutyl rubber based inner liner layer may also contain one or more sulfur curable diene-based elastomers such as, for example, c is 1,4-polyisoprene natural rubber, c is 1,4-polybutadiene rubber and styrene/butadiene rubber, or mixtures thereof. The inner liner 22 is normally prepared by conventional calendering or milling techniques to form a strip of uncured compounded rubber of appropriate width. When the tire 10 is cured, the inner liner 22 becomes an integral, co-cured, part of the tire 10. Tire inner liners and their methods of preparation are well known to those having skill in such art.

In practice, it is considered herein that, optionally, at least one of said sulfur curable rubber barrier layer (13) and said sulfur curable inner liner rubber layer (22) may:

(A) be comprised a combination of sulfur curable rubber and at least one of sulfur curable diene-based polyurethane and millable non diene-based polyurethane, or (B) have a layer of sulfur curable diene-based polyurethane on its sulfur curable rubber surface adjacent to said polyurethane sealant layer (20).

Exemplary of sulfur curable diene-based polyurethane is, for example, 7840TPUT™ from Global Specialty Chemicals Manufacturer Sartomer Company This is considered herein as being significant in a sense of promoting tack and adhesion between the polyurethane sealant layer (20) and at least one of said barrier rubber layer (13) and inner liner rubber layer (22) within the tire.

A millable polyurethane is a low molecular weight polyurethane which can be blended with other materials. Exemplary millable polyurethanes are available from, for example, TSE Industries, Inc.

The tire carcass generally may be any conventional tire carcass for use in pneumatic tires 10. Generally, the tire carcass includes one or more layers of cord-containing carcass plies and acts as a supporting structure for the tread portion 14 and sidewalls 12. The various tire components, e.g., tire tread 14, sidewalls 12, and reinforcing beads 18 may generally be selected from those conventionally known in the art. Like the tire inner liner 22, the tire carcass, tire tread 14, and beads 18 and their methods of preparation are well known to those having skill in such art.

The thickness of the pre-formed annular polyurethane sealant precursor layer 20 can vary in the unvulcanized tire. Generally, the thickness may range from about 0.13 cm (0.05 inches) to about 1.9 cm (0.75 inches) depending somewhat upon the tire itself and its intended use. For example, in passenger tires, the precursor sealant layer 20 may have a thickness in a range of about 0.33 cm (0.125 inches) whereas for truck tires, the precursor sealant layer 20 may have a thickness in a range of about 0.76 cm (0.3 inches). The built-in sealant layer 20 is generally situated in the crown region of the tire 10, and, if desired, may include colorant so that it is of a non-black color that may contrast with the black colored inner liner, tread, or sidewall so that a tire puncture can be noticed.

After the unvulcanized pneumatic tire is assembled, the tire is shaped and cured using a normal tire cure cycle. After curing, the pre-formed annular precursor sealant layer 20 is degraded and provides the pneumatic tire 10 with self-sealing properties against various puncturing objects.

Generally, the tire can be cured over a wide temperature range. For example, passenger tires might be cured at a temperature ranging from about 130° C. to about 170° C. and truck tires might be cured at a temperature ranging from about 150° C. to about 180° C. Thus, a cure temperature may range, for example, from about 130° C. to about 180° C. and for a desired period of time. In one example, the tire assembly is cured in a suitable mold at a temperature in a range of from about 150° C. to about 175° C. for a sufficient period of time to thermally degrade the polyurethane precursor layer to thereby form the seamless built-in sealant layer 20 which has puncture sealing properties.

Example I

A portion of a polyurethane sheet was obtained having a thickness of 0.125" (0.32 mm). It had a crosslink density of 0.322 millisecond[1] when determined by low field NMR. Tensile properties in machine direction (MD) and cross direction (CD) where determined and reported in the following Table 1.

TABLE 1

| Direction | MD | CD |
| --- | --- | --- |
| 50% Modulus (MPa) | 0.26 | 0.23 |
| 100% Modulus (MPa) | 0.35 | 0.31 |
| 200% Modulus (MPa) | 0.48 | 0.44 |
| 300% Modulus (MPa) | 0.61 | 0.56 |
| Ultimate tensile strength (MPa) | 1.43 | 1.47 |
| Ultimate elongation (at break) % | 716 | 509 |

From Table 1 it can be seen that the polyurethane sealant had an elongation at break of 716 percent in the machine direction (MD). Therefore it can be readily expanded, or stretched, when contained within the tire during the tire shaping.

Building a rubber tire with this material as a sealant was found to be somewhat difficult because the splice where the ends of the polyurethane precursor layer came together sometimes tended to separate to some degree, apparently when the tire was cooling as it came out of the tire mold. This is believed to be because of insufficient adhesive strength between the ends of the polyurethane sealant at the splice at a tire cure temperature of 160° C.

Example II

A layered composite similar to FIG. 3 was prepared as a layered test piece.

For the layered test piece, the following layers were assembled on top of the other in the following order:

(1) a 7"×7" (17.8×17.8 cm) calendared sulfur curable rubber tread strip of about 0.1" (0.25 cm) thickness, similar to tread (14) of FIG. 3;

(2) a 3"×3" (7.6×7.6 cm) wire cord reinforced sulfur curable rubber of about 0.068" (0.17 cm) thickness, similar to one of belt plies (16) of FIG. 3;

(3) a 7"×7" (17.8×17.8 cm) sulfur curable synthetic cord (e.g. polyester cord) reinforced rubber layer (aligned with the above wire cord reinforced rubber) of about 0.026" (0.066 cm) thickness, similar to carcass ply (17) of FIG. 3;

(4) a 3"×3" (17.8×17.8 cm) pre-formed polyurethane based precursor sealant layer (without a splice and therefore seamless) having an overall thickness of about 0.125" (0.32 cm), similar to sealant layer (20) of FIG. 3;

(5) a 7"×7" (17.8×17.8) sulfur curable rubber tire innerliner liner of thickness of about 0.03" (0.08 cm), similar to inner liner layer (22) of FIG. 2.

The above laminated test piece was cured for about 35 minutes at about 150° C. under a pressure of about 200 psi (1378 kPa).

The cured test piece was tested to evaluate puncture sealing effectiveness. In the testing process, the test piece was secured lengthwise across an open chamber of a box, which defined a bench top nail hole tester, to generally seal the opening to the chamber. The test piece was situated so that the innermost inner liner faced the open chamber and the tire tread faced outwardly. In the chamber, air pressure could be established via an inlet valve, maintained, and monitored to simulate a pressurized pneumatic tire. A nail was used to manually puncture the test piece. The test piece was subjected to puncturing by nails of varying and increasing diameter to evaluate air pressure loss after nail insertion, removal, and reinflation (if needed). Air pressure readings at each step were taken after a two-minute period. The results of the puncture sealing testing are set out in Table 2 below.

TABLE 2

(Nail Hole Sealing Capability)

| Pressure | |
|---|---|
| Initial pressure | 35 psi (241 kPa) |
| After insertion and removal of new nail of diameter of 0.136" (0.35 cm) | 35 psi (241 kPa) |
| After insertion and removal of new nail of diameter of 0.165" (0.42 cm) | 35 psi (241 kPa) |
| After insertion and removal of new nail of diameter of 0.200" (0.51 cm) | 35 psi (241 kPa) |

From Table 2 it can be seen that the nail hole sealing capability upon insertion and removal of individual nails having diameters ranging from 0.25 cm to 0.51 cm was excellent in a sense that the internal pressure of 241 kPa was maintained. The sealant from the cured test piece had a reduced crosslink density of 0.308 millisecond$^{-1}$ as compared to the precursor crosslink density of 0.322 millisecond$^{-1}$ prior to said curing.

Example III

A pneumatic tire was prepared similar to FIG. 1 with the polyurethane layer being applied as an annular ring with ends of the polyurethane layer abutted together to form a splice between ends of the polyurethane sheet. To the splice was added a strip (about 1 inch, or about 2.5 cm width) of the TPU sulfur curable diene-containing polyurethane layer to cover the splice and thereby abridge the ends of the polyurethane layer. The purpose of the TPU polyurethane strip was to secure the ends of the polyurethane layer and inhibit them from separating. The polyurethane layer had an original thickness of 0.125" (0.32 cm) wherein the polyurethane is stretched about 50 percent inside of the tire during the building of the tire to narrow its thickness to about 0.093" (0.24 cm).

It was observed that the splice between ends of the polyurethane layer apparently did not separate until the tire was inserted in a tire curing press (tire mold) and then after its removal from the hot press where a very slight separation was felt at the splice.

The nail hole sealing ability by inserting a nail through the tire from its tread through its polyurethane sealant layer (away from the splice) is reported in Table 3.

TABLE 3

(Nail hole sealing ability)

| Pressure | |
|---|---|
| Initial pressure | 36 psi (248 kPa) |
| After insertion and removal of nail of diameter of 0.1" (0.25 cm) | 33.5 psi (231 kPa) |
| Two minutes after reinflation to 36 | 36 psi (248 kPa) |
| After insertion and removal of new nail of diameter of 0.15" (0.38 cm) | 33 psi (227 kPa) |
| Two minutes after reinflation to 36 | 36 psi (248 kPa) |
| After insertion and removal of new nail of diameter of 0.193" (0.49 cm) | 32 psi (220 kPa) |
| Two minutes after reinflation to 36 | 36 psi (248 kPa) |

It can be seen from Table 3 that the polyurethane sealant demonstrated a self healing ability in a sense that it acted to seal the resulting nail hole after removal of the nail.

However, it is recognized that the satisfactorily joining the ends of the polyurethane layer at the splice could be a challenge. Accordingly, the next Example IV is presented.

Example IV

Prospective Tire

A pneumatic tire is prepared similar to FIG. 1 with a pre-formed annular seamless polyurethane layer (e.g. polyurethane layer 20 of FIG. 1 in a form of a tubular cylinder). The polyurethane layer is envisioned as having an original thickness of 0.125" (0.32 cm) with the layer being stretched about 50 percent inside of the tire during the building of the tire to narrow its thickness to about 0.093" (0.24 cm).

The nail hole sealing ability is envisioned as being similar to that of the tire of Example III upon insertion and removal of representative nails.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A pneumatic tire as a sulfur cured assembly comprised of an outer circumferential rubber tread, an underlying supporting carcass, rubber barrier layer inwardly disposed on and underlying said carcass, built-in seamless polyurethane sealant layer inwardly disposed on and underlying said rubber barrier layer and an inner liner rubber layer inwardly disposed on and underlying said polyurethane based sealant layer wherein at least one of said sulfur curable rubber barrier layer and sulfur curable inner liner rubber layer is comprised of a combination of sulfur curable rubber and sulfur curable diene-based polyurethane.

2. The tire of claim 1 wherein said rubber barrier layer is comprised a combination of sulfur curable rubber and sulfur curable diene-based polyurethane.

3. The tire of claim 1 wherein said inner liner rubber layer is comprised of a combination of sulfur curable rubber and sulfur curable diene-based polyurethane.

4. The tire of claim 1 wherein both of said rubber barrier layer and said inner liner rubber layer are comprised of a combination of sulfur curable rubber and sulfur curable diene-based polyurethane.

* * * * *